United States Patent [19]
Husted et al.

[11] Patent Number: 5,211,445
[45] Date of Patent: May 18, 1993

[54] HINGE MECHANISM FOR VEHICLE SEAT ASSEMBLY WITH A LEAF RETAINING SPRING

[75] Inventors: David W. Husted, Ann Arbor; Jayesh B. Patel, Canton, both of Mich.

[73] Assignee: Hoover Universal, Inc., Plymouth, Mich.

[21] Appl. No.: 753,321

[22] Filed: Aug. 30, 1991

[51] Int. Cl.⁵ .................... B60N 2/02; E05D 11/10
[52] U.S. Cl. ........................ 297/379; 16/335
[58] Field of Search .................. 16/335; 297/379, 354

[56] References Cited
U.S. PATENT DOCUMENTS

| | | | |
|---|---|---|---|
| 539,741 | 5/1895 | Ingram | 16/335 |
| 774,409 | 11/1904 | Wise | 16/335 |
| 3,652,127 | 3/1972 | Freedman et al. | 297/379 |
| 4,634,182 | 1/1987 | Tanaka | 297/379 |

FOREIGN PATENT DOCUMENTS 2829701 1/1980 Fed. Rep. of Germany ...... 297/379

Primary Examiner—John Sipos
Assistant Examiner—Carmine Cuda
Attorney, Agent, or Firm—Harness, Dickey & Pierce

[57] ABSTRACT

A hinge mechanism for a vehicle seat assembly is disclosed which includes a leaf spring on the seat back arm of the hinge with one end extending from the seat back arm and engaging the edge of a plate member across which the spring and slides as the seat back is rotated from its upright operative position to a forward dump position. In the upright position, the spring end is seated into a radially recessed detent portion in the plate member to hold the seat back in its upright position. The leaf spring prevents a slight forward rotation of the seat back when the seat back is unoccupied during normal vehicle operation.

7 Claims, 2 Drawing Sheets

HINGE MECHANISM FOR VEHICLE SEAT ASSEMBLY WITH A LEAF RETAINING SPRING

BACKGROUND AND SUMMARY OF THE INVENTION

The present invention relates to a hinge mechanism for a vehicle seat assembly and in particular to a hinge mechanism including a leaf retaining spring for use with a seat assembly in which the seat back is rotatable to a forward dump position. The leaf spring is used to prevent rattling and vibration of the seat back during normal vehicle operation when the seat assembly is unoccupied.

Vehicle seat assemblies can be generally described as including a lower seat cushion and an upright seat back. Many seat assemblies, particularly those used in two-door motor vehicles, have a seat back that can be tilted forward from its normal upright position to a forward dump position to improve the access to the area behind the seat assembly. Such seat assemblies typically include an inertia locking mechanism to prevent forward rotation of the seat back when it is subjected to deceleration forces greater than a minimum value to prevent seat back rotation during a vehicle collision or during sudden stopping. Inertia latch mechanisms of this type typically allow the seat back to be rotated forward when not subject to deceleration forces by simply pushing the seat back forward.

A certain amount of free-play exists in these seat assemblies that allow the seat back to rotate forward slightly during deceleration particularly when the seat assembly is unoccupied. This slight forward rotation can cause a rattle that is annoying to the vehicle occupants. Various means have been developed to avoid such a rattle including the use of coil extension springs on the hinge mechanism to hold the seat back in its upright position. The spring is extendable to enable forward rotation of the seat back to the dumped position when sufficient force to overcome the spring is applied to the seat back. The spring is mounted to function as an over-center spring so that in the dumped position, the spring holds the seat back forward. The spring must then be overcome to return the seat back to its upright position. Such a spring mechanism requires mounting posts to be attached to both the seat back and the seat cushion which, along with the spring itself, adds to the cost and weight of the seat assembly.

Accordingly, it is an object of the present invention to provide an improved retention mechanism to hold the seat back in place to prevent rattling. It is a further object to provide a retention mechanism that does not also act to hold the seat back in the forward dump position as does an over-center coil spring.

It is a feature of the present invention to use a leaf spring retention mechanism that is configured to require no separate attachment to hardware.

It is an advantage of the present invention that once the seat back is initially rotated forward from the upright position that the leaf spring does not apply a force to hold the seat back in the dumped position.

In the preferred embodiment, the leaf spring is mounted at one end to the seat back arm of the hinge which supports the seat back. The seat back arm is pivotally attached to the seat bracket which is coupled to the lower seat cushion. The opposite end of the leaf spring is shaped to form a hook that is seated into a detent in the seat bracket or recliner plate if the seat assembly is equipped with a recliner.

To rotate the seat back forward, sufficient force must be applied to the seat back to unseat the spring hook end from the detent, permitting the seat back to rotate forward. As it rotates, the spring hook end slides across an arcuate edge surface of the seat bracket or recliner plate. Once the hook end is unseated from the detent, the spring no longer biases the seat back to any one position.

Further objects, features and advantages of the invention will become apparent from a consideration of the following description and the appended claims when taken in connection with the accompanying drawings.

DETAILED DESCRIPTION OF THE INVENTION

Figure 1:
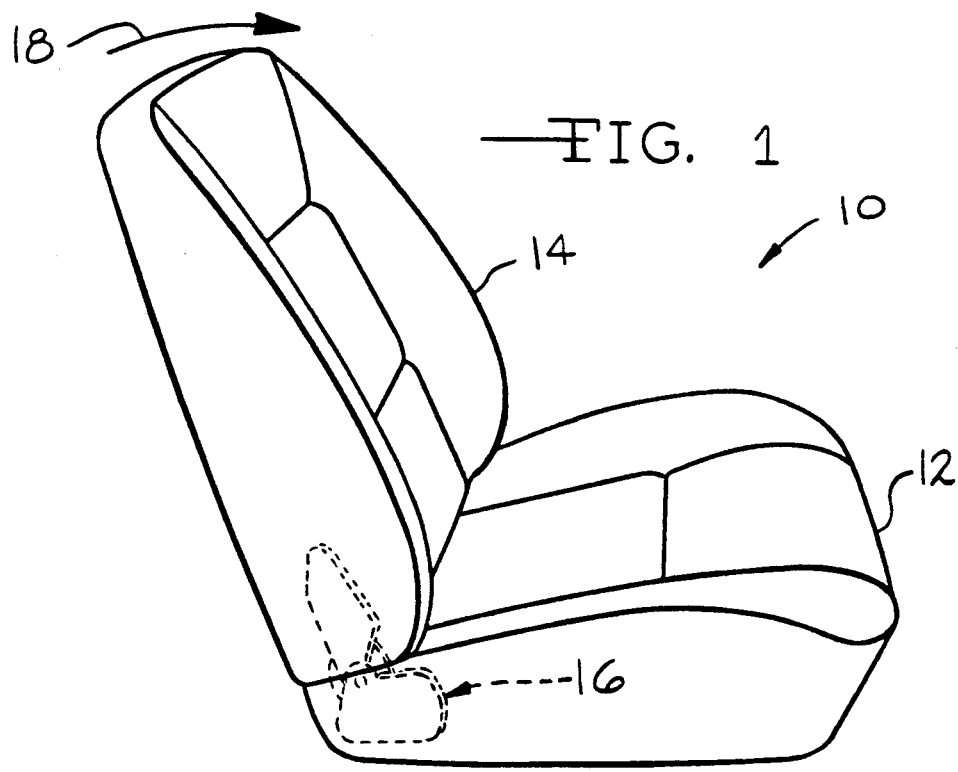
FIG. 1 is a perspective view of a typical seat assembly including the hinge mechanism of the present invention.

A typical vehicle seat assembly is shown in FIG. 1 and designated generally at 10. Seat assembly 10 includes a lower seat cushion 12 and an upright seat back 14. Hinge mechanism 16 is used to pivotally mount the seat back 14 to the seat cushion 12. The hinge mechanism enables the seat back to be rotated forward in the direction of arrow 18, from the upright operative position shown in FIG. 1 to a forward dump position to improve the accessibility to the area behind the seat assembly 10.

Figure 2:
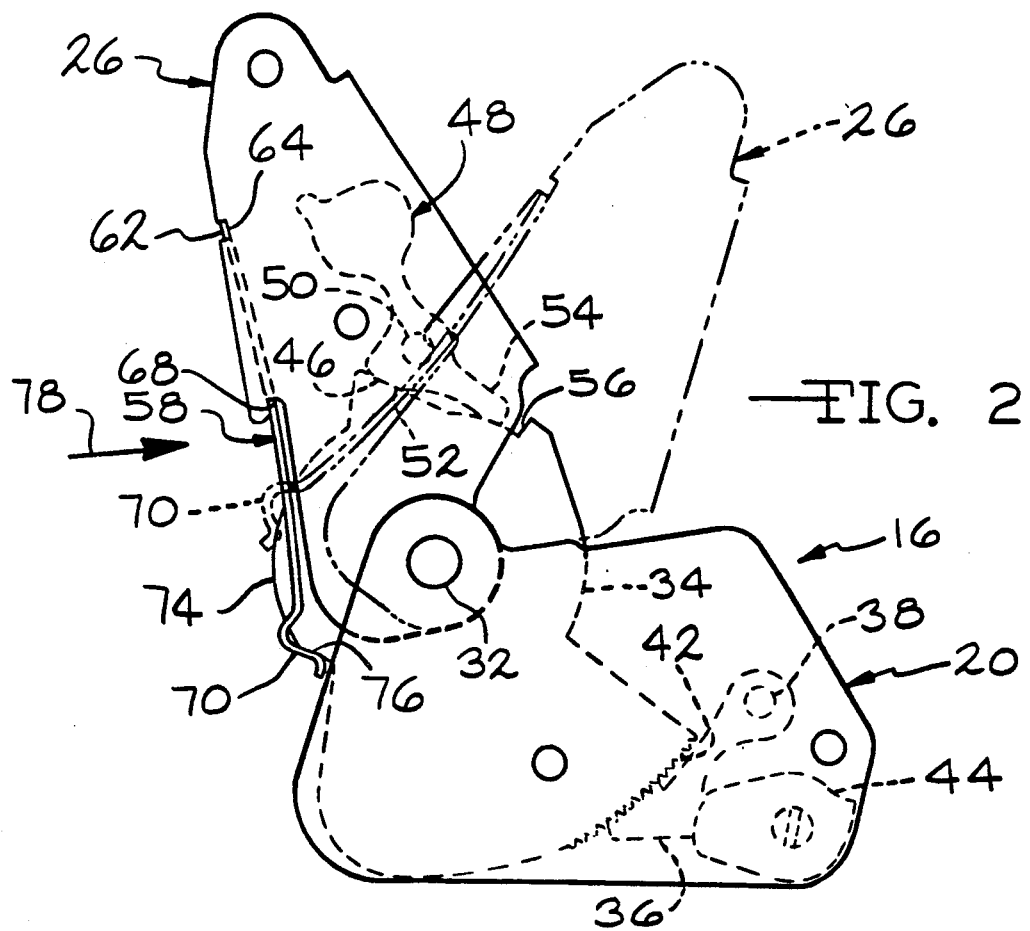
FIG. 2 is a side elevational view of the hinge mechanism of the present invention.
Figure 3:
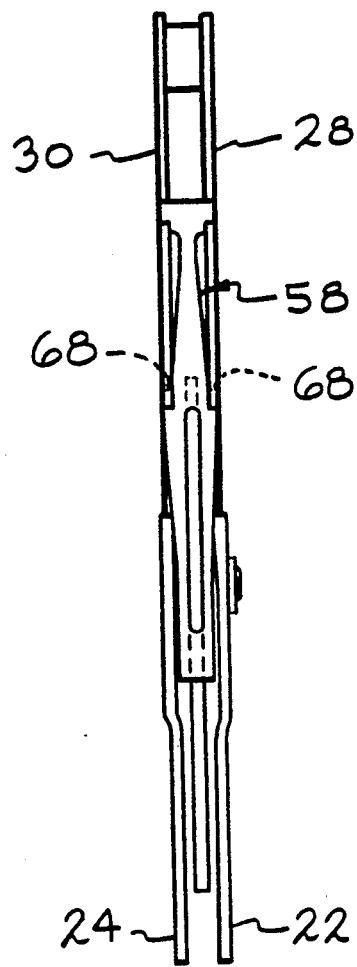
FIG. 3 is a rear elevational view of the hinge mechanism of FIG. 2.
Figure 4:
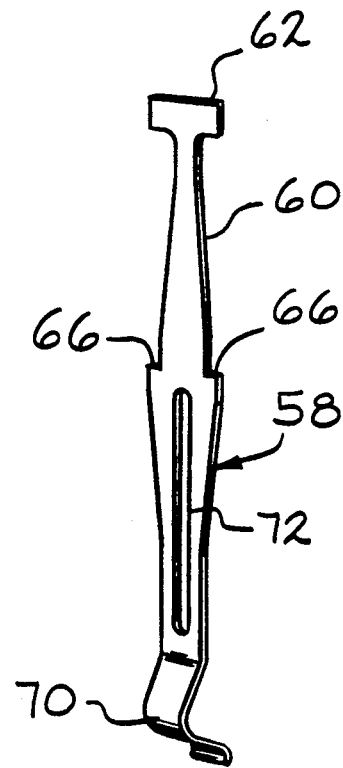
FIG. 4 is a perspective view of the leaf spring of the present invention.

Hinge mechanism 16 is shown in greater detail in FIGS. 2 and 3. The hinge mechanism includes a stationary bracket 20 constructed of two space plates 22 and 24 secured to one another. The bracket 20 is secured to the support frame (not shown) of the seat cushion 12. A seat back arm 26, constructed of spaced plates 28 and 30 is rotatably attached to the stationary bracket 20 about pivot 32. The rotational mount enables the seat back arm 26 to be rotated from its normal upright operative position shown in solid lines in FIG. 2 to the forward dump position shown in broken lines. The frame of seat back 14 (not shown) is secured to the seat back arm 26 so that the seat back rotates about the axis of pivot 32.

The seat bracket 20 is described as being stationary since it is rigidly secured to the seat cushion. The seat back arm, however, is not stationary since it is rotatable relative to the seat cushion. The bracket 20, seat back arm 26 and the sector 34 (described below) are all planar bodies generally parallel to one another and perpendicular to the axis of pivot 32.

The embodiment shown in FIG. 2 includes a recliner mechanism to enable the angle of the seat back to be adjusted relative to the seat cushion within a predetermined range of upright operative positions. The reclining mechanism includes a sector 34 formed of a single plate also mounted to the bracket 20 for rotation about the pivot 32. Sector 34 includes an arcuate edge surface having teeth 42. The toothed edge is concentric about pivot 32. Pawl 36 mounted to bracket 20 by pivot 38 has teeth for engagement with the teeth 42 of the sector to hold the sector in plate. Cam 44 holds the pawl 36 into position engaged with the sector to effectively hold the sector stationary to the seat bracket 20. Cam 44 is manually rotatable by a handle (not shown) to release the pawl to enable rotation of the sector for adjustment of the seat back angle.

Inertia latch 48 prevents forward rotation of the seat back 14 while the seat back is experiencing deceleration loads above a minimum value. Latch 48 is mounted to the seat back arm for rotation about pivot 50. The latch 48 is configured so that gravity urges the latch to rotate in a counterclockwise direction about pivot 50 until the latch surface 46 engages the surface 52 of the sector 34. In this position, projection 54 of latch 48 is in alignment with the stop surface 56 of sector 34. Forward rotation of the seat back is limited to a very small degree until contact between the projection 54 and the stop surface 56.

When the seat assembly is not subjected to deceleration, forward rotation of the seat back disengages the latch from sector surface 52 and gravity rotates the latch counterclockwise, as viewed in FIG. 2. This raises the projection 54 over the stop surface 56, thus permitting continued rotation of the seat back to the forward dump position. However, when the seat back is subjected to deceleration forces and it is rotated forward disengaging the latch from the sector surface 52, the deceleration force on the latch 48 overcomes gravity, preventing counterclockwise rotation of the latch. The projection 54 will then engage stop surface 56 preventing continued forward rotation of the seat back.

The engagement of the latch surface 46 with the sector 34 supports the seat back to prevent rearward rotation of the seat back. The latch 48 thus supports the seat back and couples the seat back to the sector 34 which is held in stationary position relative to the bracket 20. Adjustment of the angle of the seat back is accomplished by rotation of the cam 44 to disengage the pawl 36 from the sector 34 thus enabling the sector to be rotated.

The nature of the latch 48 provides for slight forward rotation of the seat assembly before the projection 54 engages the stop surface 56. This motion of the seat back, when the seat is unoccupied, can result in a rattle or vibration that is annoying to other vehicle occupants. To prevent this motion, a leaf spring 58 is attached to the seat back arm 26 for engagement with the sector 34 to resist movement of the seat back. The upper end of leaf spring 58 is generally T-shaped with the longitudinal member 60 positioned between the two plates 28 and 30 forming the seat back arm 26. The cross member 62 is seated into notches 64 in rear edge of plates 28 and 30. Transversely extending edge surfaces 66 of the leaf spring are seated into the downwardly oriented notches 68 in the rear edge of the plates 28, 30. The notches 64 and 68 formed in the edge of the seat back arm hold the spring 58 in place. When fully assembled, the spring 58 is bowed slightly so as to be concave when viewed in the direction of arrow 78. This bending of the spring holds the cross member 62 firmly in notch 64. The spring 58 is thus attached to the seat back arm without the use of separate fasteners. This is a significant advantage compared to the coil over-center spring that requires mounting posts to be added to both the arm 26 and bracket 20.

The opposite end of the leaf spring is shaped to form a hook engaging portion 70. A central slot 72 in leaf spring 58 enables the sector 34 to project through the spring. Sector 34 includes an arcuate edge surface 74 over which the hook portion 70 slides across as the seat back is tilted forward. The arcuate edge surface 74 is concentric about the pivot. In the upright operative position of the seat back, when the surface 52 of latch 48 is in engagement with the sector, the hook portion 70 is seated into a radially recessed detent or flat portion 76 in the edge of sector 34 adjacent to the arcuate edge surface 74.

The spring end or hook portion 70 is deflected radially outwardly from the straight line position of the spring defined by the notches 64 and 68 creating the bending load in said spring to hold it in place. The spring is bent outwardly slightly more when the spring engages the arcuate surface 74 than when it is seated in the detent 76. A minimum force must be applied to the seat back to unseat the spring from the recess to rotate the seat back forward.

The force necessary to rotate the seat back to move the hook portion 70 from the detent 76 onto the arcuate surface 74 is greater than the deceleration forces experienced by the seat back during normal vehicle operation. Accordingly, during vehicle deceleration, the seat back does not tend to rotate forward. Thus, the objective of the present invention of providing a simple device to prevent seat back rotation and rattle has been accomplished with the leaf spring 58.

Furthermore, once the spring hook 70 has been removed from the detent 76, the spring does not act to bias the seat back to a particular position. There is no spring force to overcome to return the seat to its upright position.

It is to be understood that the invention is not limited to the exact construction illustrated and described above, but that various changes and modifications may be made without departing from the spirit and scope of the invention as defined in the following claims.

We claim:

1. A hinge mechanism for a seat assembly, said seat assembly including a lower seat cushion and a seat back coupled to said seat cushion by said hinge mechanism, said seat back having an upright operative position and being rotatable from said operative position to a forward dump position, said hinge mechanism comprising:

a seat back arm adapted to be coupled to said seat back;

a plate member;

means for securing said plate member to said seat cushion;

pivot means for rotatably coupling said seat back arm to said plate member for rotation relative to said plate member about an axis perpendicular to said plate member, said arm being rotatable between a first position corresponding to the upright operative position of said seat back and a second position corresponding to the forward dump position of said seat back;

latch means operative associated with said seat back arm and said plate member for preventing rearward rotation of said seat back arm from said first position and for preventing forward rotation of said seat back arm from said first position when said seat back is experiencing a predetermined deceleration, said latch means permitting forward rotation of said seat back from said first position in the absence of said predetermined deceleration; and a leaf spring mounted to an edge of said arm with one end extending therefrom and engaging an edge surface of said plate member, said edge surface being arcuate and concentric about said pivot over which said spring end slides as said arm is rotated, said arcuate edge surface terminating in a radially recessed detent portion into which said spring end is seated when the seat back is in said upright operative position whereby a minimum force must be applied to said seat back to remove said spring end from said detent to rotate aid seat back from said upright operative position.

2. The hinge mechanism of claim 1 wherein said plate member seat back arm and said leaf spring are shaped to mount said leaf spring on said arm without the use of additional fasteners.

3. The hinge mechanism of claim 1 wherein said edge surface deflects said spring end radially outwardly creating a bending stress in said spring.

4. The hinge mechanism of claim 1 wherein said means for securing said plate member to said seat cushion includes a bracket fixed to said seat cushion and rotatably attached to said plate member and said seat back arm by said pivot means and means for selectively coupling said plate member to said bracket to prevent relative rotation therebetween.

5. The hinge mechanism of claim 4 wherein said selective coupling means includes a second arcuate edge surface on said plate member concentric about said pivot means and having teeth therein and a pawl rotatably mounted to said bracket having teeth for engagement with said plate member teeth to prevent rotation of said plate member relative to said bracket and means for selectively rotating said pawl into and out of engagement with said plate member whereby the position of said plate member can be adjusted relative to said bracket.

6. The hinge mechanism of claim 4 wherein said seat back arm, said plate member and said bracket are all substantially planer bodies all disposed generally perpendicularly to the axis of said pivot means.

7. The hinge mechanism of claim 5 wherein said leaf spring includes a longitudinally extending slot therein through which a portion of said plate member extends.

* * * * *

UNITED STATES PATENT AND TRADEMARK OFFICE
CERTIFICATE OF CORRECTION

PATENT NO. : 5,211,445

DATED : May 18, 1993

INVENTOR(S) : David W. Husted, Jayesh B. Patel

It is certified that error appears in the above-identified patent and that said Letters Patent is hereby corrected as shown below:

In Column 5, line 9, Claim 1, after "rotate", delete "aid" and insert --said--.

Signed and Sealed this

Eighteenth Day of January, 1994

Attest:

BRUCE LEHMAN

*Attesting Officer*  *Commissioner of Patents and Trademarks*